United States Patent
Ballauf et al.

(10) Patent No.: US 7,707,831 B2
(45) Date of Patent: May 4, 2010

(54) METHOD FOR CONTROLLING BOOST PRESSURE IN AN INTERNAL COMBUSTION ENGINE FOR MOTOR VEHICLES

(75) Inventors: Jorg Ballauf, Wettstetten (DE); Siegmar Lampe, Bremen (DE); Daniel Beese, Braunschweig (DE); Holger Braun, Gifhorn (DE)

(73) Assignee: Audi, AG, Ingolstadt (DE)

( * ) Notice: Subject to any disclaimer, the term of this patent is extended or adjusted under 35 U.S.C. 154(b) by 366 days.

(21) Appl. No.: 11/826,631

(22) Filed: Jul. 17, 2007

(65) Prior Publication Data
US 2009/0019848 A1    Jan. 22, 2009

(51) Int. Cl.
F02D 23/00    (2006.01)
F02B 33/44    (2006.01)

(52) U.S. Cl. .............. 60/602; 60/605.1; 701/103; 701/105

(58) Field of Classification Search ........ 60/600–605.1; 701/103, 105
See application file for complete search history.

(56) References Cited

U.S. PATENT DOCUMENTS

| | | | |
|---|---|---|---|
| 5,680,763 A * | 10/1997 | Unland et al. ................ | 60/602 |
| 6,148,615 A * | 11/2000 | Vogt et al. ................... | 60/602 |
| 6,220,232 B1 | 4/2001 | Torno et al. .................. | 60/602 |
| 6,425,247 B1 * | 7/2002 | Schmid ........................ | 60/602 |
| 6,427,445 B1 * | 8/2002 | Isaac et al. ................... | 60/602 |
| 6,830,121 B1 * | 12/2004 | Johnson ....................... | 60/602 |
| 6,918,250 B2 * | 7/2005 | Baeuerle ...................... | 60/602 |
| 7,200,995 B2 * | 4/2007 | Schroeder et al. ............ | 60/602 |
| 7,561,956 B2 * | 7/2009 | Ehlers et al. ................. | 60/602 |
| 2007/0144174 A1 * | 6/2007 | Baeuerle et al. ............ | 60/605.1 |
| 2008/0104957 A1 * | 5/2008 | Birkner et al. .............. | 60/602 |
| 2009/0076705 A1 * | 3/2009 | Colesworthy et al. ....... | 701/103 |
| 2009/0090106 A1 * | 4/2009 | Muller ........................ | 60/602 |

FOREIGN PATENT DOCUMENTS

| | | |
|---|---|---|
| DE | 19502150 | 5/1996 |
| DE | 19712861 | 10/1998 |
| DE | 19812843 | 9/1999 |
| DE | 19905420 | 8/2000 |
| DE | 19935901 | 2/2001 |
| DE | 10243268 | 3/2004 |

* cited by examiner

Primary Examiner—Thai Ba Trieu
(74) Attorney, Agent, or Firm—Novak Druce & Quigg LLP

(57) ABSTRACT

A method for controlling boost pressure in an internal combustion engine is provided. The method includes a boost pressure control device, which is used to control the boost pressure in an internal combustion engine. The boost pressure control device includes a bypass unit, preferably in the exhaust gas flow of the internal combustion engine. The bypass unit includes an actuating device which enables the bypass unit when a predetermined actuating device setpoint value is reached. An adapted value is established as the correction value (pwgad) as a function of preset and/or detected internal combustion engine parameters (rlsol, nmot). The adapted value is used to adapt the setpoint value for the actuating device, which is specified as a function of the operating point, for a predetermined control deviation between a boost pressure actual value and a boost pressure setpoint value.

25 Claims, 5 Drawing Sheets

WG = waste gate

METHOD FOR CONTROLLING BOOST PRESSURE IN AN INTERNAL COMBUSTION ENGINE FOR MOTOR VEHICLES

The invention relates to a method for controlling boost pressure in an internal combustion engine.

BACKGROUND OF THE INVENTION

Such boost pressure control is known from DE 195 02 150 C1, for example. In this case a boost pressure control device includes an integral action controller whose integration of the control deviation is limited to a predetermined limit value to avoid severe overshooting. For this purpose various limit values are specified for stationary and for dynamic operating states, whereby the dynamic limit value is provided with corrections that are dependent on the operating characteristics and is provided with an adaptive correction, and in addition is increased by a safety margin. The aim is to ensure consistently good quality of control, even when the components involved in the control are subject to contamination or wear. Similar boost pressure control is also known from DE 198 12 843 A1, in which, for operation of the boost pressure control over a broad operating range without excessively retarding the control process or causing overshooting in the control, a manipulated variable for an actuator is transformed to values such that after transformation of the values, a linear relationship exists between the manipulated variable and the control variable. A correction value for a limit value which is specified for an integral portion of an integral action controller is also known in conjunction with boost pressure control from DE 197 12 861 A1.

Due to serial dispersion dictated by the manufacturing process, for example in spring pretensioning in the waste gate region, such as in the specific region of a spring-loaded pressure box which acts on a bypass valve, for some vehicles a different control characteristic is obtained which is undesirable. The same also applies to aging symptoms of the components of a controlled system, which likewise may vary from vehicle to vehicle.

The object of the present invention, therefore, is to provide a method and a device for controlling boost pressure in an internal combustion engine by means of which, in particular for serial dispersion and aging symptoms of the components of the controlled system, a high-quality and reproducible control may be provided with the lowest possible control deviation between the setpoint boost pressure and the actual boost pressure.

SUMMARY OF THE INVENTION

According to the invention, an adapted value is established as the correction value as a function of preset and/or detected internal combustion engine parameters, by means of which the setpoint or threshold value of the actuating device for a bypass unit, specified as the function of the operating point, for a specified control deviation is adapted between a boost pressure actual value and a boost pressure setpoint value as a function of the operating point.

By use of such a process, a system response which is consistent with respect to the control quality and reproducibility may be ensured over the series, since determination of the correction value for the setpoint of the actuating device specified as a function of the operating point makes such an adaptation possible, even when serial dispersion and aging symptoms appear in the components of the controlled system for the boost pressure control, and the adaptation takes these phenomena into account. In other words, it is possible to adjust the boost pressure with the least possible control deviation by using such an operating point-dependent adaptation routine for boost pressure control which acts on the threshold value of an actuating device for the bypass unit.

The correction value is preferably determined as a function of a setpoint engine filling and/or an engine rotational speed of the internal combustion engine. Specifically, the actuating device setpoint value is a setpoint pressure of a spring-loaded pressure box, which in turn is a component of a bypass valve which forms a boost pressure control valve and which preferably may be acted on by pressure via a timing valve which is preferably controlled by a control device for the boost pressure control. The correction value is a pressure value which is preferably subtracted from the actuating device setpoint value.

The correction value is preferably determined by an adaptation device in an adaptation routine which is divided into adaptation enabling, index creation in the direction of the engine rotational speed, index creation in the setpoint engine filling direction, interpolation of an adaptation characteristic map, intermediate storage of the adapted values, enabling of writing of the adaptation characteristic map, writing of the adaptation characteristic map, a continuity check for the adaptation characteristic map, a quality check of the learned values, and copying of the learned values into a memory array. The correction value is stored in a nonvolatile memory array (adaptation array) whose address variables are preferably the engine rotational speed and the setpoint engine filling.

DETAILED DESCRIPTION OF AN EMBODIMENT OF THE INVENTION

Figure 1:
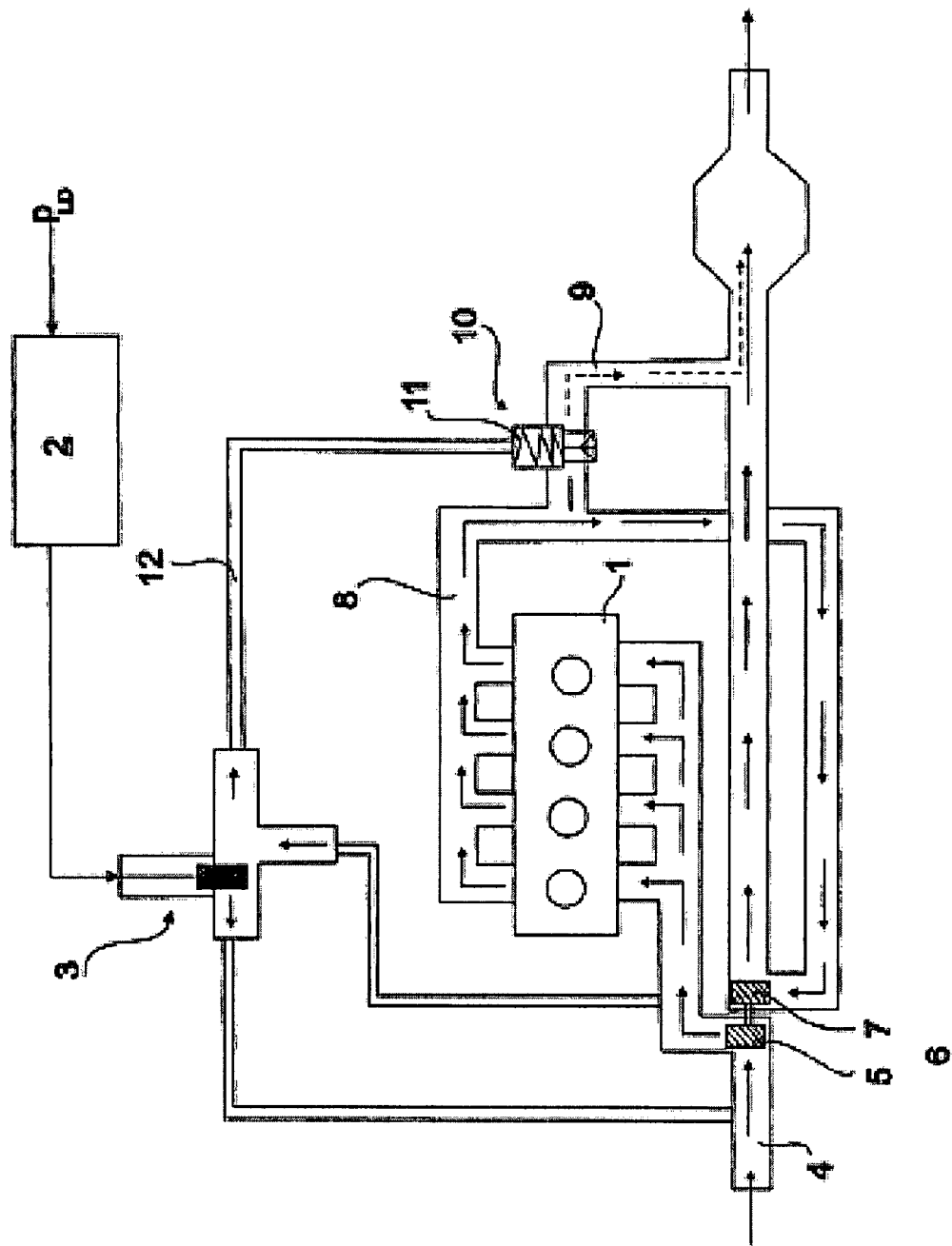
FIG. 1 schematically shows a diagram of an electronic boost pressure control system.

FIG. 1 schematically shows a diagram of an electronic or electropneumatic boost pressure control system for an internal combustion engine 1 whose optimal boost pressure is controlled via a boost pressure control device 2 for the boost pressure control system. A pressure sensor, not illustrated here, detects the boost pressure and relays this information to the boost pressure control device 2, which in turn actuates a timing valve 3, the pulse duty factor of which controls the cross-sectional opening of the timing valve in a manner known as such.

As further shown in FIG. 1, the intake manifold 4 contains a compressor wheel 5 for an exhaust gas turbocharger 6, the turbine wheel 7 of which is located in the exhaust manifold 8. A bypass line 9 branches from the exhaust manifold 8 in the form of a waste gate, by means of which at least a portion of the exhaust gas flow may be introduced into the exhaust gas duct while bypassing the turbine wheel 7. For enabling of the bypass line 9, a boost pressure control valve or bypass valve 10 is provided which has a spring-loaded waste gate pressure box 11. As a function of the preferably electrical or electropneumatic timing valve 3, the pressure box may be acted on by a predetermined pressure value in the form of an actuating device setpoint value which is specified as a function of the operating point.

The basic operating mode is as follows: The engine control device computes a setpoint boost pressure at any point in time, based on the driver's request. On the basis of this setpoint boost pressure and the boost pressure measured downstream from the compressor 5, an actuating signal is computed for the timing valve 3, which is situated between the control line 12 to the spring-loaded waste gate pressure box 11 and the intake manifold 4, and also between the pressure line downstream from the compressor (see FIG. 1). If the boost pressure is increased corresponding to the setpoint boost pressure, as a result of actuation of the timing valve 3 the valve cross section between the control line 12 and the intake manifold 4 is continuously increased. This causes the pressure to drop in the spring-loaded waste gate pressure box 11, and the bypass valve 10 starts to close due to the spring pretensioning on the spring-loaded waste gate pressure box 11. This results in a continuous increase in the turbine mass flow, the converted power furnished to the compressor, and the boost pressure.

If the boost pressure is reduced according to the setpoint boost pressure, as a result of actuation of the timing valve 3 the valve cross section between the control line 12 and the intake manifold 4 is continuously decreased. This causes the pressure in the spring-loaded waste gate pressure box 11 to increase to a maximum value of the boost pressure, and the bypass valve 10 starts to open against the spring pretensioning on the spring-loaded waste gate pressure box 11. This results in a continuous decrease in the turbine mass flow, the converted power furnished to the compressor, and the boost pressure.

Figure 2:
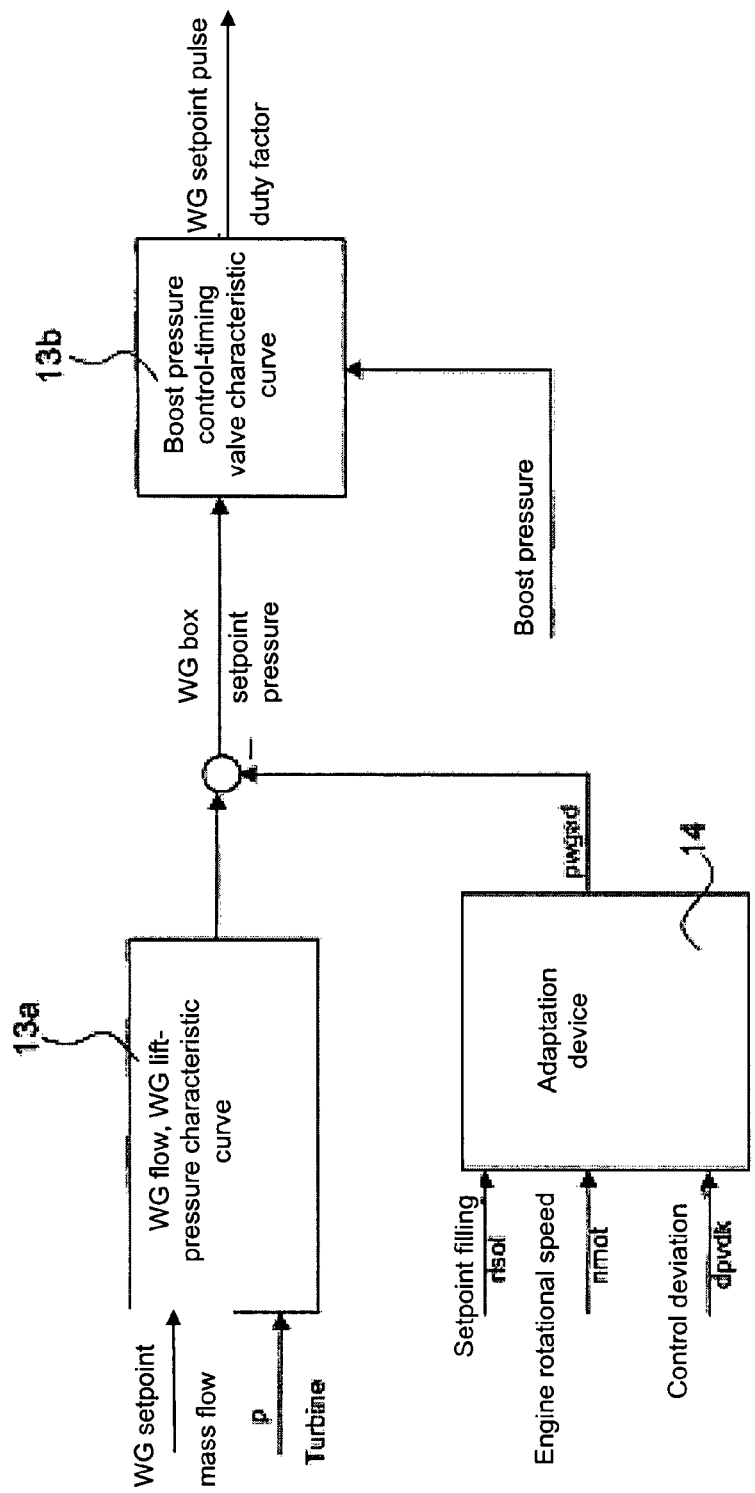
FIG. 2 schematically shows a block diagram of the threshold value adaptation according to the invention for a pressure box in the boost pressure control device.

FIG. 2 schematically shows the process of boost pressure control according to the invention for the internal combustion engine 1, in which the adaptation device 14 according to the invention is integrated into the model-based pilot control device 13. Specifically, the pilot control device 13 comprises a first control device 13a in which as a function of the setpoint mass flow through the bypass line 9, i.e., the waste gate flow, and a waste gate- or bypass-side lift-pressure characteristic curve a setpoint pressure at the pressure box 11 is specified, which in a second control device 13b in turn results in a setpoint pulse duty factor in the bypass region via a boost pressure/timing valve characteristic curve in conjunction with a boost pressure.

To adapt the setpoint pressure at the pressure box 11 with regard to possible serial dispersion and aging symptoms of the components of the controlled system for the boost pressure control, as a function of the setpoint engine filling, the engine rotational speed, and a control deviation (dpvdk) specified as a function of the operating point an adapted value is determined between a boost pressure actual value and a boost pressure setpoint value by means of the adaptation device 14, the adapted value being in the form of a correction value (pwgad) which represents a pressure value, and which is subtracted from the computed pressure box setpoint pressure value.

Specifically, by use of the adaptation device 14 an adaptation routine is run which is divided into a number of hierarchies, the first being an adaptation enabling. At this point enabling occurs for data recording into an intermediate memory, to be described in greater detail below, for the adaptation device 14 when the boost pressure buildup is concluded and a D [differential] portion of the boost pressure control during the transient effect has decayed. The read enabling of a memory array, on the other hand, takes place in an interpolation routine which likewise is described in greater detail below.

As an additional condition, the data recording is not enabled until the waste gate control is active and the engine temperature has exceeded an applicable threshold. In addition, the pulse duty factor for the timing valve 3 must lie between applicable minimum and maximum limits. For the case in which the pulse duty factor is situated at the lower or upper limit, continuing the adaptation is not meaningful, since the regulating range of the actuator or timing valve 3 is fully utilized.

Furthermore, the setpoint load demand, which is described by the quotient of the setpoint engine filling (rlsol) and the maximum engine filling (rlmax), should trigger the adaptation enabling, which is applicable for full and partial load operating phases. In partial load, for the evaluation range of the adaptation routine the gradient of the setpoint boost pressure should lie within an applicable band, thereby preventing adaptation enabling during the dynamic pressure buildup.

If all the individual conditions are present, the write enabling for the correction value occurs after an additional debouncing time. In principle, it is also possible to select fewer conditions.

An additional adaptation routine for the adaptation device 14 is the index creation in the direction of the engine rotational speed (nmot) and in the direction of the setpoint engine filling (rlsol). For the assignment and reading of values of the memory array, whole-number indices are required for addressing the individual array elements. In this case, two indices in the nmot direction and two indices in the rlsol direction are formed by way of example. Taken together, these indices describe the adjacent array elements of the instantaneous working or operating point.

Figure 3:
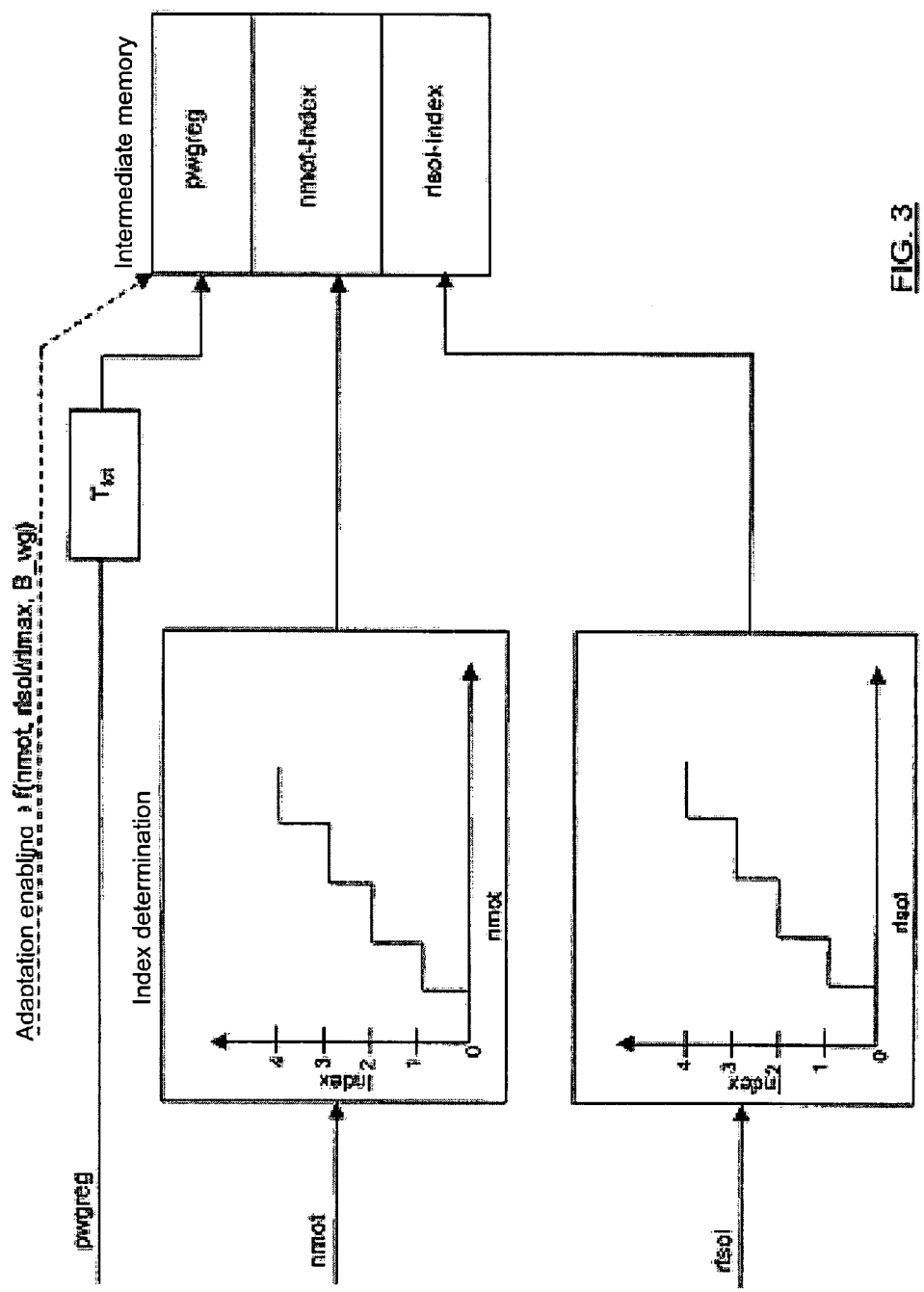
FIG. 3 shows the writing of an intermediate memory.

The indices for the array axes are always determined from the instantaneous values of the engine rotational speed (nmot) and the setpoint engine filling (rlsol). The table illustrated in FIG. 3 shows the particular value ranges of the engine rotational speed and the setpoint engine filling that are associated with particular indices.

Within the index computation, bits are formed which indicate the point in time of an index change. To prevent "toggling" of these values for a stationary working point, an index change is not indicated until it has occurred twice in the same direction. The index change bits are necessary for the point in time of the evaluation of the system state and the subsequent writing of the intermediate memory.

Interpolation of the adaptation characteristic map takes place next, whereby the memory array (PWGADAP) is read for generation of the correction value (pwgad) for the instantaneous working point.

After interpolation is enabled, the array may be linearly or bilinearly interpolated, i.e., read. If the instantaneous working point lies within the limits of the memory array, bilinear interpolation is started. If the working point lies outside the limits, linear interpolation is performed. For linear interpolation, fixed engine rotational speed and setpoint engine filling values are used which likewise have been calculated during the index computation corresponding to the instantaneous indices.

The bilinear interpolation is carried out according to the following equation:

$$g(x_i, y_i) = u_{00} \times [((x_i - x_1)(y_i - y_1)/(x_0 - x_1)(y_0 - y_1))]$$
$$u_{01} \times [((x_i - x_1)(y_i - y_0)/(x_0 - x_1)(y_1 - y_0))]$$
$$u_{10} \times [((x_i - x_0)(y_i - y_1)/(x_1 - x_0)(y_0 - y_1))]$$
$$u_{11} \times [((x_i - x_0)(y_i - y_0)/(x_1 - x_0)(y_1 - y_0))]$$

The factors $u_{00}$, $u_{01}$, $u_{10}$, and $u_{11}$ are the neighboring points of the instantaneous working point which are generated from the memory array. The variable x stands for the engine rotational speed nmot, and the variable y stands for the setpoint engine filling rlsol. The index i represents the instantaneous working point, the index 0 represents the left or the lower interpolation point based thereon, and the index 1 represents the right or the upper interpolation point.

The linear interpolation is performed when one of the two array inputs (engine rotational speed nmot or setpoint engine filling rlsol) exceeds or falls below the maximum or minimum interpolation point, respectively. In this case interpolation is performed in the respective other direction.

As further shown in FIG. 3, the interpolation point indices and the respective associated change value (pwgreg) are transferred to an intermediate memory, the value (pwgreg) being the value of the change in the boost pressure control adaptation computed from the control deviation (read about the value of the system time constant after an index change), which is computed using an applicable amplification characteristic curve. For this purpose, the time progression of the index change bit is delayed by use of a circular memory. The delay time may be applied. The change value (pwgreg) is later added to the instantaneous adapted value in the particular working point of the memory array in order to determine the final correction value (pwgadp).

In addition, the adapted value for the first working point may be proportionately determined directly after the transient effect of the boost pressure. This is necessary because at the time of the transient effect there is no assurance that an index change has taken place. This proportionate adapted value is then assigned to the element in the memory array which has been determined before the time that adaptation was enabled by the index.

Furthermore, multiple entries of the same working points into the intermediate memory may be prevented. To this end, each new working point is labeled in a bit array during a filling cycle of the intermediate memory. If this working point appears again in the same cycle, this working point is prevented from being entered into the intermediate memory.

Figure 4:
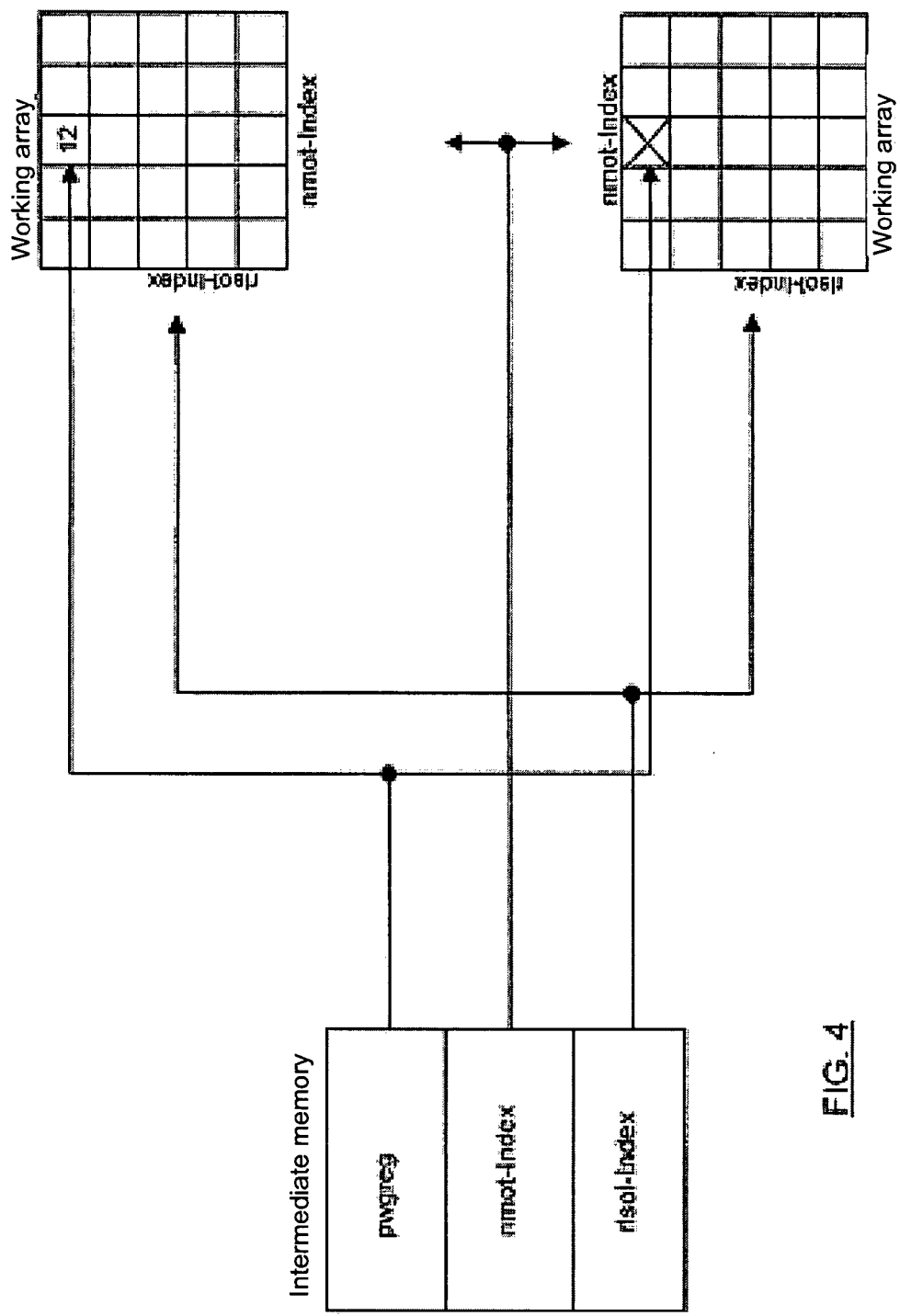
FIG. 4 shows the writing of a working adaptation array.

After the end of an operating phase of the boost pressure control, enabling of the transfer of values contained in the intermediate memory is permitted. The values stored in the intermediate memory are transferred to a working adaptation array, as schematically illustrated in FIG. 4.

The change value (pwgreg) is added to the associated value of a working adaptation array. For this purpose, each working point contained in the intermediate memory is first labeled in a working bit array so that this working point cannot be manipulated by the subsequent continuity check, to be discussed in greater detail below. The values in the intermediate memory cannot be directly transferred to the memory array and to the bit array, since the boost pressure control could become active again during the subsequent manipulation of the matrix elements, which could allow discontinuities to occur during reading of the instantaneous correction value (pwgad). Consistent reading of the correction value (pwgad) can be ensured at all times by transferring to a working adaptation array and copying the array values (when boost pressure control is inactive) after the continuity check is completed.

After the contents of the intermediate memory are transferred to the working adaptation array, the continuity manipulation of the array takes place in a subsequent hierarchical step. For this purpose, for each working point transferred from the intermediate memory first the row (nmot direction) in the working adaptation array is manipulated. In other words, adjacent working points which have not been run in the instantaneous learning cycle or which have not been labeled in the bit array as sufficiently adapted are raised or lowered with respect to the instantaneous working point in order to avoid discontinuities. If an adjacent working point is represented in the learning cycle and has already been adapted (entry in the bit array), the manipulation for this and all subsequent working points in the affected row of the working adaptation array is terminated. After the row for the instantaneous working point of the learning cycle is manipulated, the column is then manipulated in the same manner.

For enabling the manipulation of the row direction, a detailed check is made as to whether the elements to the left of the instantaneously observed element, which has been transferred from the intermediate memory to the array, have been labeled. For the left element, the element to the left and below and the element to the left and above are each checked for whether a label has been placed. The same check is also made in the direction to the right. If no label has been found, the manipulation for the left, the right, or both sides is enabled.

Figure 5:
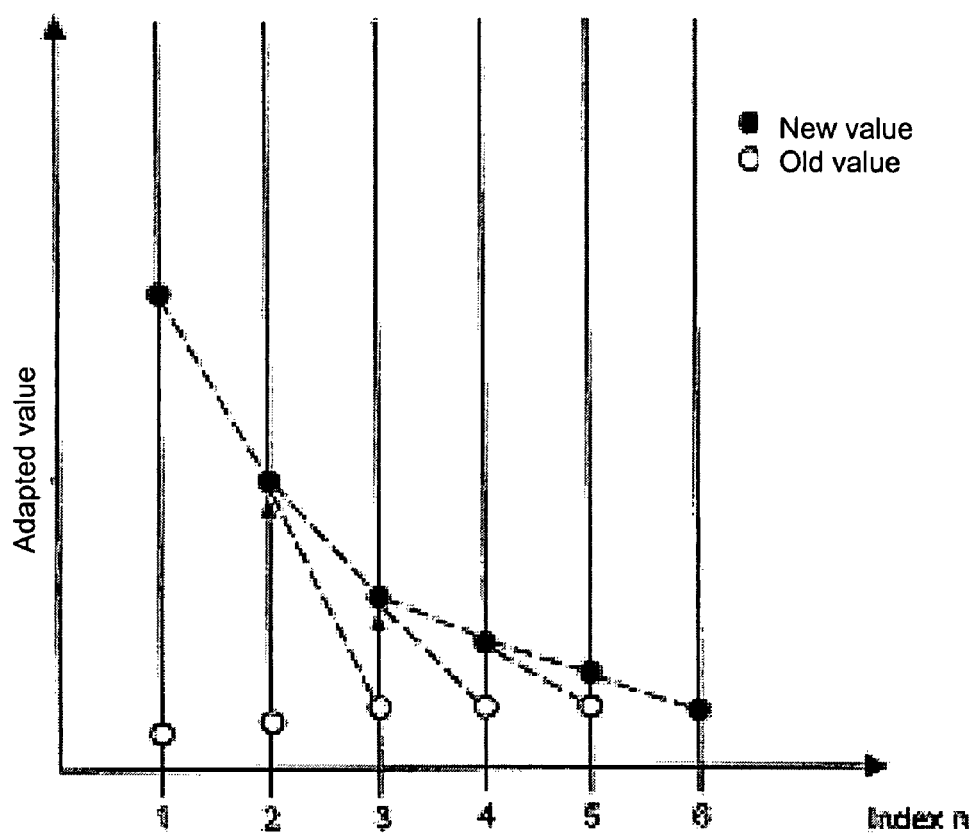
FIG. 5 shows the manipulation of the working adaptation array in one direction.

When matrix manipulation in the row direction is enabled, an average value is formed from the value to the left and the value to the right of the working point to be manipulated ($p_n=(p_{n-1}+p_{n+1})/2$). This is consecutively performed either to the left border or to the right border of the working adaptation array, or only to a point already labeled as "learned." This process is illustrated for a direction shown in FIG. 5 by way of example. The new value for the index 1 is a learned value transferred from the intermediate memory.

Once the rows for the instantaneous working point have been checked and possibly manipulated, the columns are then checked. This involves the columns in the instantaneous working point and the columns in the possibly manipulated elements of the row. For both the upper and the lower element of the working array a check is made as to whether a manipulation is allowable, and enabling in the upper direction, in the lower direction, or in both directions is permitted.

When matrix manipulation in the column direction is enabled, analogously to the manipulation in the row direction an average value is formed from the value above and the value below the working point to be manipulated. This is consecutively performed either up to the upper border or down to the lower border of the working adaptation array, or only to a point already labeled as "learned."

Since all of the values transferred from the intermediate memory into the working adaptation array have first been labeled in the working array, after the continuity check is completed these values are checked for quality. Only a value to be marked as "learned" is labeled in the working array.

After the continuity manipulation has been performed for all values in the intermediate memory, the values in the working array and in the working adaptation array are transferred to the bit array, i.e., the memory array, from which the instantaneous correction values (pwgad) are read as a function of the operating point and are subtracted from the computed [pressure] box setpoint pressure. The memory array is a non-volatile adaptation array (PWGADAP) whose addressing variables are the engine rotational speed (nmot) and the setpoint engine filling (rlsol), which in this case are used as examples and are most preferred.

The invention claimed is:

1. A method for controlling boost pressure in an internal combustion engine, comprising:
   using a boost pressure control device to actuate a bypass unit when a setpoint value for an actuating device is reached, and adapting the setpoint value between a boost pressure actual value and a boost pressure setpoint value based on a correction value,
   wherein the correction value is a function of an internal combustion engine parameter selected from the group consisting of preset internal combustion engine parameters, detected internal combustion engine parameters, and combinations thereof, and
   wherein the correction value is determined by an adaptation device in which the established correction value is stored in a nonvolatile memory whose address variables are the preset and/or detected internal combustion engine parameters, which is selected from a group consisting of an engine rotational, a setpoint engine filling, and combinations thereof.

2. The method according to claim 1 wherein the setpoint value is a setpoint pressure of a spring-loaded pressure box,
   wherein the spring-loaded pressure box is a component of a bypass valve,
   wherein the bypass valve forms a boost pressure control valve,
   wherein the bypass valve is acted on by pressure via a timing valve,
   wherein the timing valve is controlled by a control device for the boost pressure control, and the correction value is a pressure value, and
   wherein the setpoint value is adapted by subtracting the correction value from the actuating device setpoint value.

3. The method according to claim 1, wherein the adaptation device enables data recording when at least one of the following conditions are met:
   a) a boost pressure buildup is concluded,
   b) a D portion of the boost pressure control has decayed,
   c) a bypass unit is active,
   d) an engine temperature corresponds to or has exceeded a predetermined minimum temperature,
   e) a pulse duty factor or actuating signal for a boost pressure timing valve for the boost pressure control device lies within a predetermined lower and upper pulse duty factor limit which is specified as a function of a pulse duty factor minimum value and a pulse duty factor maximum value,
   f) a setpoint load demand equals or exceeds a predetermined setpoint load value,
   g) in the case of partial load operation, a gradient of the setpoint boost pressure lies within a predetermined range.

4. The method according to claim 3, wherein the data recording is enabled when at least one condition is present after an additional debouncing time.

5. The method according to claim 3, wherein the setpoint load demand is determined by dividing a setpoint engine filling by a maximum engine filling.

6. The method according to claim 1, further comprising forming at least one index in the memory array in a direction of at least one internal combustion engine parameter, wherein the at least one index describes an instantaneous operating or working point of the internal combustion engine.

7. The method according to claim 6,
   wherein at least one engine rotational speed index, is formed in a direction of an engine rotational speed, and
   at least one setpoint engine filling index, is formed in a direction of a setpoint engine filling, and
   wherein the at least one engine rotational speed index and the at least one setpoint engine filling index, together, describe adjacent array elements of an instantaneous working point.

8. The method according to claim 6, wherein the at least one index is determined from instantaneously detected or computed values of the at least one internal combustion engine parameter, and wherein specific index values are associated with the at least one internal combustion engine parameter in a characteristic map.

9. The method according to claim 6, further comprising forming bits, which indicate a point in time of an index change.

10. The method according to claim 9, wherein an index change is not indicated until the index change has occurred at least twice in the same direction, wherein the index change occurs at least twice in the same direction when the instantaneous operating or working point of the internal combustion engine that is described by the index increases at least twice or decreases at least twice.

11. The method according to claim 6, wherein the at least one index and a change value are transferred to an intermediate memory,
    wherein the change value is entered into the correction value,
    wherein the change value is a function of a control deviation,
    wherein the change value is read about a system time constant after an index change.

12. The method according to claim 11, wherein the change value at a predetermined subsequent point in time is added to an instantaneous adapted value, entered into the correction value, in a respective working point of the memory array.

13. The method according to claim 12, wherein the adapted value of a first working point is proportionately determined directly after a transient effect of the boost pressure, and this proportionate adapted value is assigned to the element in the memory array which has been determined before the data recording for the adaptation device was enabled by the index.

14. The method according to claim 11, wherein to avoid multiple entries of the same working points into the intermediate memory, each new working point is labeled in a bit array during a filling cycle of the intermediate memory.

15. The method according to claim 11, wherein after the end of an operating phase of the boost pressure control, the values stored in the intermediate memory are transferred to a working adaptation array, and the change value is added to the associated value of the working adaptation array.

16. The method according to claim 15, wherein each working point contained in the intermediate memory is first labeled in a working array.

17. The method according to claim 15, wherein for inactive boost pressure control and/or after completion of a continuity check of the array values, the array values in the working adaptation array are transferred to the memory array, from which the instantaneous correction values are read.

18. The method according to claim 17, wherein in the continuity check of the array values in the working adaptation array, manipulation is performed in the row and column direction, including the working points transferred from the intermediate memory.

19. The method according to claim 11, wherein the system time constant is determined by use of an applicable amplification characteristic curve, for which purpose a time progression of an index change bit indicating a point in time of an index change is delayed.

20. The method according to claim 11, wherein the time progression is delayed by use of a circular memory.

21. The method according to claim 1, wherein the memory array is read and interpolated for determining the correction value for the instantaneous operating or working point.

22. The method according to claim 21, further comprising carrying out an interpolation when the instantaneous operating or working point lies within the memory array, wherein the interpolation is carried out according to the following equation:

$$g(x_i, y_i) = u_{00}x[((x_i - x_1)(y_i - y_1)/x_0 - x_1)(y_0 - y_1))]$$
$$u_{01}x[((x_i - x_1)(y_i - y_0)/x_0 - x_1)(y_1 - y_0))]$$
$$u_{10}x[((x_i - x_0)(y_i - y_1)/x_1 - x_0)(y_0 - y_1))]$$
$$u_{11}x[((x_i - x_0)(y_i - y_0)/x_1 - x_0)(y_1 - y_0))]$$

wherein $u_{00}$, $u_{01}$, $u_{10}$, and $u_{11}$ are the neighboring points of the instantaneous working point which are generated from the memory array, x stands for a first internal combustion engine parameter, in particular the engine rotational speed, and y stands for a second internal combustion engine parameter, in particular the setpoint engine filling, and the index i represents the instantaneous working point, the index 0 represents the left or the lower interpolation point based thereon, and the index 1 represents the right or the upper interpolation point based thereon.

23. The method according to claim 21, further comprising carrying out a linear interpolation when the instantaneous operating or working point lies outside the memory array, wherein the linear interpolation is carried out using predetermined internal combustion engine parameters.

24. The method according to claim 23, wherein a fixed value corresponding to at least one instantaneous index is determined during an index computation for the memory array.

25. The method according to claim 1, wherein the bypass unit is in the exhaust gas flow of the internal combustion engine.

* * * * *